United States Patent [19]

Taniguchi et al.

[11] Patent Number: 4,682,273
[45] Date of Patent: Jul. 21, 1987

[54] ILLUMINATING ANGLE ADJUSTING APPARATUS FOR AN ELECTRONIC FLASH DEVICE

[75] Inventors: Toshihiko Taniguchi; Yukio Miki, both of Sakai, Japan

[73] Assignee: Minolta Camera Kabushiki Kaisha, Osaka, Japan

[21] Appl. No.: 819,348

[22] Filed: Jan. 16, 1986

[30] Foreign Application Priority Data

Jan. 18, 1985 [JP] Japan ................................ 60-5619[U]

[51] Int. Cl.$^4$ ............................................. G03B 15/02
[52] U.S. Cl. ..................................... 362/18; 362/277; 362/319
[58] Field of Search .................... 362/16, 18, 277, 319

[56] References Cited

U.S. PATENT DOCUMENTS

| | | | |
|---|---|---|---|
| 4,141,059 | 2/1979 | Shiojiri | 362/319 X |
| 4,190,880 | 2/1980 | Esaki | 362/319 X |
| 4,276,579 | 6/1981 | Yako | 362/18 X |

Primary Examiner—Lloyd L. King
Attorney, Agent, or Firm—Watson, Cole, Grindle & Watson

[57] ABSTRACT

An illuminating angle adjusting apparatus for an electronic flash device is capable of adjusting the illuminating angle of the electronic flash device in response to drive of a motor smoothly and accurately by a combination of a guide groove and a guide rail provided almost in the same vertical position as a rack gear of a zooming frame and an output gear of a transmission mechanism engaged with one another. A driving force produced by the motor is transmitted to the zooming frame through the engagement of the output gear and the rack gear to move the zooming frame relative to a light emitting portion of the electronic flash device with the same being guided by the guide groove and the guide rail. The movement of the zooming frame causes the change in the illuminating angle of the electronic flash device as it carries a lens at a front portion thereof.

9 Claims, 9 Drawing Figures

ILLUMINATING ANGLE ADJUSTING APPARATUS FOR AN ELECTRONIC FLASH DEVICE

BACKGROUND OF THE INVENTION

The present invention relates to an illuminating angle adjusting apparatus to be used in an electronic flash device for photography.

In conventional illuminating angle adjusting apparatuses i.e., shown in FIGS. 8 and 9, a zooming frame (1) carrying an optical lens at the front end thereof is electrically driven by a motor (2). A transmission mechanism (4) which transmits the driving force of the motor is provided between two inner lateral side surfaces of the zooming frame (1) and above the upper surface of a light emitting portion (5). Moreover, a pair of rack gears (6), (6) stationarily provided on the upper internal surfaces of the right and left side walls (1a), (1b) of the zooming frame (1) are engaged with corresponding output gears (4a), (4b) of the transmission mechanism (4) at a plane (a) which is in the almost the same plane as the upper surface of the light emitting portion (5). The plane (a) is defined as being such a plane in which the transmission of the driving force from the transmission mechanism to the rack gears is carried out. As shown in FIG. 8, guide grooves (8), (8) for guiding the zooming frame are further provided below the plane (a) and at the center of lateral side walls of the light emitting portion (5). When the motor (2) is driven, a driving force is transmitted to the rack gears (6), (6) of the zooming frame (1) through the transmission mechanism (4) to move the zooming frame (1) along the guide groove (8). This movement of the zooming frame changes the clearance or separation between the light emitting portion (5) and the optical lens and thereby causes a change in the illuminating angle of the electronic flash device.

The guide grooves (8), (8) for guiding the zooming frame are provided at the area spaced by the distance (l) from the plane (a), so that a large moment is applied on the guide grooves (8), (8) due to the positional difference between the plane (a) and the guide grooves (8), (8) by the distance (l). Thereby a large frictional force is generated at the guide grooves, resulting in a disadvantage that the zooming frame (1) cannot move smoothly.

SUMMARY OF THE INVENTION

It is an object of the present invention to provide an illuminating angle adjusting apparatus which eliminate play in the vertical direction and ensures smooth movement of the zooming frame.

In order to attain the object mentioned above, the illumination angle adjusting apparatus of the present invention for an electronic flash device is provided with a guide means for a zooming frame almost in the same vertical position as the driving force output means and the driven means of a transmission mechanism. The driving force output means and the driven means are engaged with one another to transmit a driving force of a motor to the zooming frame for moving the zooming frame along the guide means relative to a light emitting portion of a body member. The movement of the zooming frame relative to the light emitting portion causes change in the illuminating angle of the electronic flash device.

With the structure mentioned above, the illuminating angle adjusting apparatus of the present invention does not allow generation of a large moment at the guide means upon drive of the motor because the guide means is disposed almost in the same vertical position as the driving force output means and the driven means being in engagement. Therefore, a frictional force which might hinder smooth movement of the zooming frame is minimized, allowing accurate adjustment of the illuminating angle of the electronic flash device.

The above and other objects, features and advantages of the present invention will become more apparent from the following description when taken in conjunction with the accompanying drawings in which preferred embodiments of the present invention are shown by way of illustrative examples.

DETAILED DESCRIPTION OF THE PREFERRED EMBODIMENTS

Figures 1, 3:
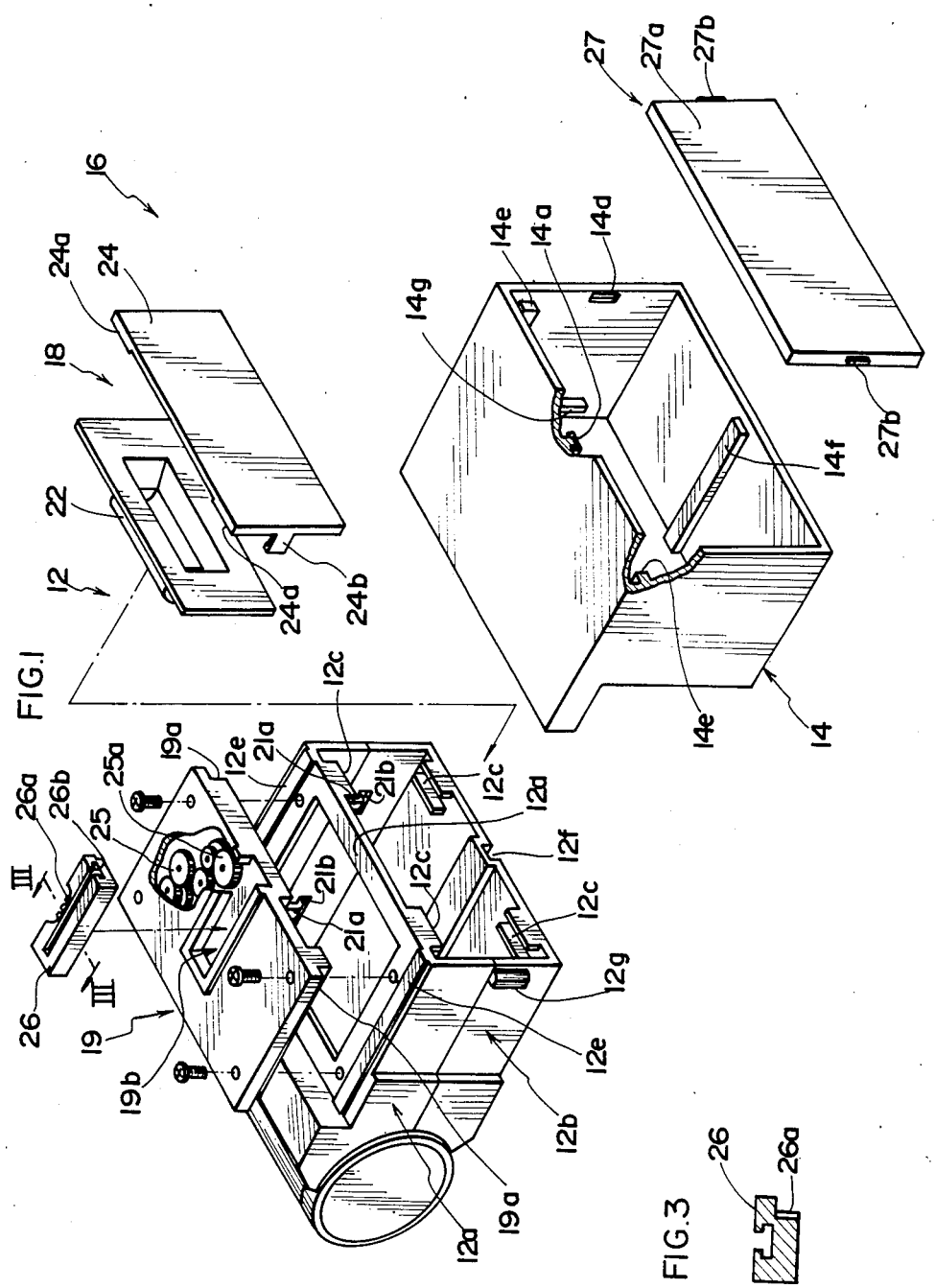
FIG. 1 is a disassembled perspective view of illuminating angle adjusting apparatus illustrating a first embodiment of the present invention.
FIG. 3 is a sectional view along the line III—III shown in FIG. 1.
Figure 2:
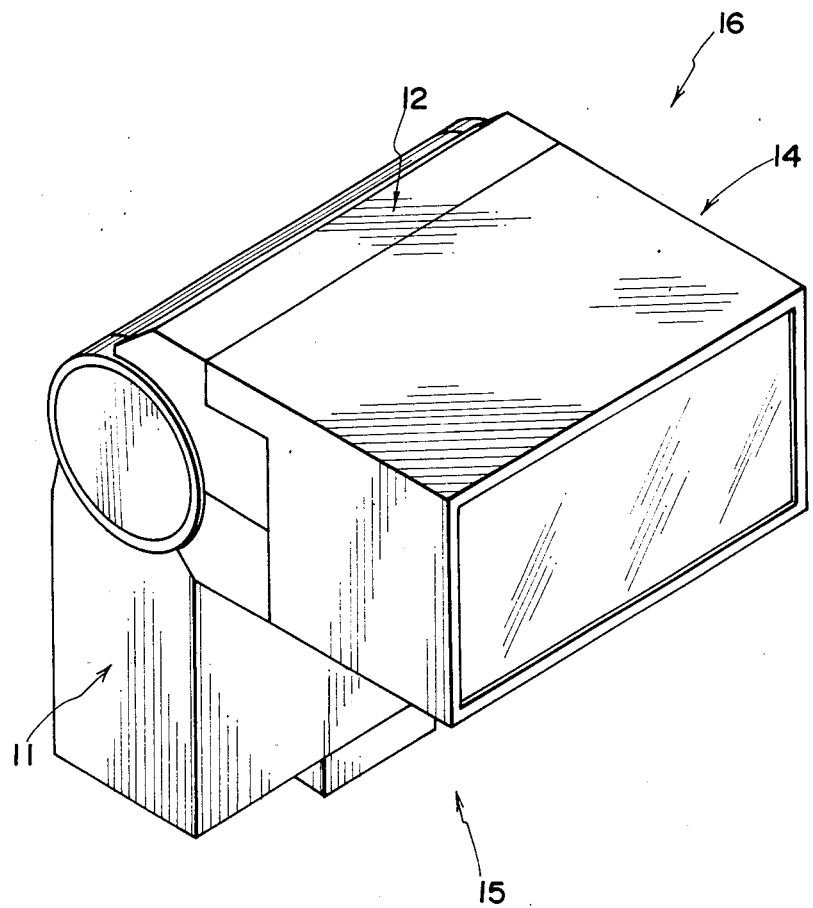
FIG. 2 is a perspective view of an electronic flash device for photography including the illuminating angle adjusting device.

As shown in FIG. 2, an electronic flash device for photography 15 is composed of a flash device body (11), a light emitting part (12) and a zooming frame (14). An illuminating angle adjusting apparatus (16) is composed of the light emitting part (12) and the zooming frame (14). As shown in FIG. 1, the zooming frame (14) has a rectangular section and the light emitting part (12) is composed of almost U-shaped upper mold (12a), almost U-shaped lower mold (12b), light emitter including a xenon tube (18) and a driving part accommodation case (19). A couple of areas at the front end of the upper and lower molds (12a), (12b) are respectively provided with a pair of convexed areas, fitting grooves (12c), (12c), (12c), (12c) are formed between the convexed areas. Elastic engaging pawls (21a), (21a), (21a), (21a) are provided to the two areas of opposing internal surfaces of the lateral side walls of the upper mold (12a) and the engaging stepped portions (21b), (21b), (21b), (21b) are provided to two areas of opposing internal surfaces of the lateral side walls of the lower mold (12b) corresponding to the elastic engaging pawls (21a), (21a), (21a), (21a). The light emitter (18) is engaged with the fitting grooves (12c), (12c), (12c), (12c) and simultaneously the upper molds and the lower molds (12a), (12b) and the light emitter (18) are integrally assembled by the engaging of the elastic engaging pawls (21a), (21a), (21a), (21a) and the engaging stepped portions (21b), (21b), (21b), (21b). The rear end portions of the upper mold (12a) and the lower mold (12b) are integrated and provided rotatably in vertical at the upper part of flash device body (11). At the center of the external wall of the bottom part of the lower mold (12b), a rail groove (12f) having the rectangular lateral section is formed. In addition, the light emitter (18) is assembled in this way that a reflector (22) fixing the xenon tube at the rear surface is formed, a panel (24) having abutting convex portions (24a), (24a) at the right and left sides in such a way that a pair of openings for radiating generated heat is formed in the upper and lower direction at the front surface is also provided, and the panel (24) is integrally assembled to the reflector (22) through elastic engaging pawls (24b), (24b) formed at the center of right and left sides of the panel (24). Moreover, the driving system accommodation case (19) encases a transmitting portion (25) which includes a reduction gear group and allows a motor (30) shown in FIG. 5 to be attached at the lower portion thereof. The driving system accommodating case (19) is attached by four screws to the upper external wall (12d) of the upper mold (12a). When the case is attached, the U-shaped guide grooves (12i), (12i) are formed by a pair of convex areas (12e), (12e) formed like the rails respectively to the area near the right and left side walls of the upper external wall (12d) of the upper mold (12a) and a pair of L-shaped stepped portions (19a), (19a) formed respectively to the right and left side walls of the driving system accommodation case (19).

Figure 4:
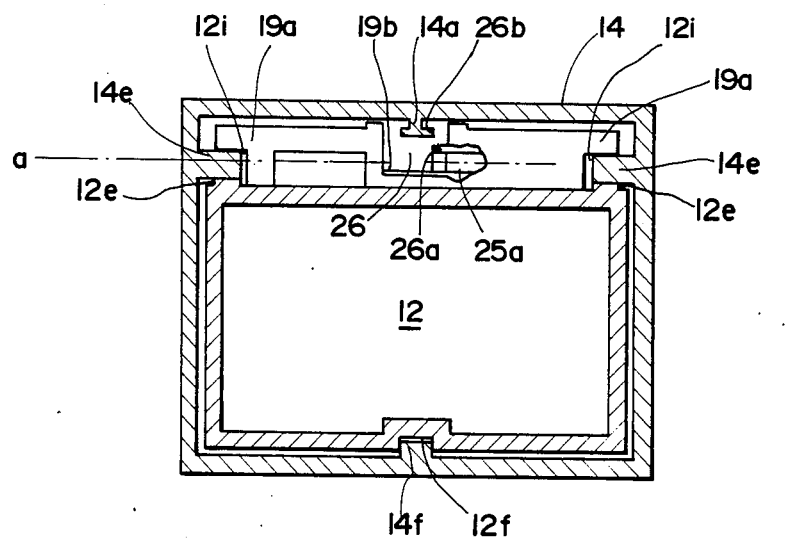
FIG. 4 is a sectional view of the first embodiment.

A concave groove (19b) as shown in FIG. 4 is formed at the center of the upper external wall (12d) of the driving system accommodation case (19). A driven member (26) comprising a rack gear (26a) at the lower part of the one side wall to be driven by the transmitting portion is fitted into the concave groove (19b). An aperture is formed at the front part of the one side wall of this concave groove (19b). When the driven member (26) is fitted into the concave groove (19b), the output gear (25a) which is the driving force output member of the transmitting portion (25) engages with the rack gear (26a). A driving force transmission mechanism is formed by the output gear (25a) and the driven member (26). A reverse T-shaped engaging groove (26b) is formed in the longitudinal direction at the upper surface of the driven member (26).

On the other hand, a reverse T-shaped engaging protruded part (14a) is formed at almost the center of upper internal wall of the zooming frame (14) and this reverse T-shaped engaging protruded part (14a) is provided with a protruded part of engaging pawl (not illustrated) at the bottom surface. When the reverse T-shaped engaging protruded part (14a) of the zooming frame (14) is engaged with the reverse T-shaped engaging groove (26b) of the driven member (26), the protruded part of engaging pawl engages with the concave area (not illustrated) formed at the bottom surface of said engaging groove (26b) so that the zooming frame (14) and the driven member (26) are integrally provided. Moreover, the guide rails (14e), (14e) having lateral rectangular section are respectively formed at the upper part of right and left internal side surfaces of the zooming frame (14), in order to prevent generation of a large moment in the vertical direction, while the guide rail (14f) having the lateral rectangular section at the center of internal wall of bottom part in order to prevent generation of a large moment in the horizontal direciton. A horizontal guide means is formed by the U-shaped guide grooves (12i), (12i) of the light emitting part (12) and guide rails (14e), (14e) formed on the zooming frame (14).

The zooming frame (14) also comprises an optical lens (27) attached thereto. The optical lens (27) is provided with a Fresnel lens on its front surface (27a). Concave portions (14d), (14d) are formed on the zooming frame (14) at the front center of the inner surfaces of the lateral side walls thereof, meanwhile convex portions (27b), (27b) are formed at the center of the lateral side surfaces of the optical lens (27). The optical lens (27) and the zooming frame (14) are integrally provided through engagement of the concave portions (14d), (14d) and the convex portions (27b), (27b).

Figure 5:
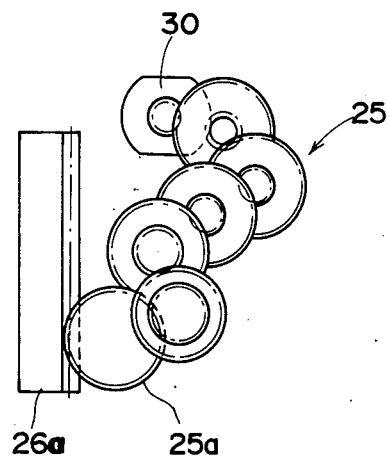
FIG. 5 is a plan view of a transmission mechanism of the first embodiment.

As shown in FIG. 4 and FIG. 5, when the zooming frame (14) is engaged with the light emitting part (12), the reverse T-shaped engaging protruded part (14a) of the zooming frame (14) and the reverse T-shaped engaging groove (26b) of the driven member (26) are engaged with each other, and the zooming frame (14) and the driven member (26) are integrally fixed.

Meanwhile, the guide rails (14e), (14e) of the zooming frame (14) are slidably engaged with the guide grooves (12i), (12i) and moreover the guide rail (14f) of the zooming frame (14) is slidably engaged with the rail groove (12f) of the light emitting part (12).

In above structure, when a motor (30) is driven, a driving force is transmitted to a rack gear (26a) through the transmitting portion (25), the zooming frame (14) is moved forward or backward in the direction parallel to the optical axis of the emitted light, relative position between the panel (24) and th optical lens (27) and the irradiation angle of the light emitted can be adjusted. As explained above, since the zooming frame (14) can be moved with one motor (30) and one rack gear (26a), a number of parts can be reduced and the assembling steps can also be reduced. Moreover, since the position of engagement between the right and left U-shaped guide grooves (12i), (12i) seved as a guide portion of zooming frame (14) and the guide rails (14e), (14e) and the position of engagement between the output gear (25a) and the rack gear (26a) forming a driving force transmitting plane (a) from the motor (30) to the zooming frame (14) are provided in the almost the same plane, a vertical large moment is not generated on the guide portion when the rack gear (26a) is driven. Accordingly, the zooming frame (14) can be moved smoothly in the optical axis direction of the emitted light.

Meanwhile, a lower guide portion is constituted by the engagement of the rail groove (12f) formed at the center of the lower mold in the lateral direction and the guide rail (14f) formed at the center of the zooming frame (14) in the lateral direction and the upper guide is constituted by the engagement of the driven member (26) fixed to the center of the zooming frame (14) in the lateral direction and the concave groove (19b) formed at the center of said driving system accommodation case (19) in the lateral direction. As a result, these upper and lower guide portions are located respectively almost at the center in the lateral direction. The distances from the engaging portion of the output gear (25a) and the rack gear (26a) to the upper and lower guide portions are closed each other in the lateral direction. Therefore, generation of a lateral large moment of the zooming frame (14) can be prevented. Accordingly, the zooming frame (14) can be moved more smoothly in the optical axis direction of the emitted light. Moreover, as explained above, since the driving force transmission mechanism including the driven member (26) and the output gear (25a) is provided at the center of the right and left side surfaces of the zooming frame (14), the guide portion consisting of the guide grooves (12i), (12i) and the guide rails (14e), (14e) can be provided at the same height as the driving force transmission mechanism without interference on the driving force transmission mechanism.

Moreover, amount of movement of the zooming frame (14) in the front direction (minimum irradiation angle of emitted light) is restricted when two pairs of convex portions (12g), (12g), (14g), (14g) collide with each other. The first pair of convex portions (12g), (12g) is formed at the right and left side surfaces in the vicinity of front aperture of said lower mold (12b). And the second pair of convex portions (14g), (14g) is formed at the right and left side internal surface in the vicinity of the rear aperture of the zooming frame (14). The zooming frame (14) can be prevented from careless removal from the light emitting part (12) from above collision.

Figure 6:
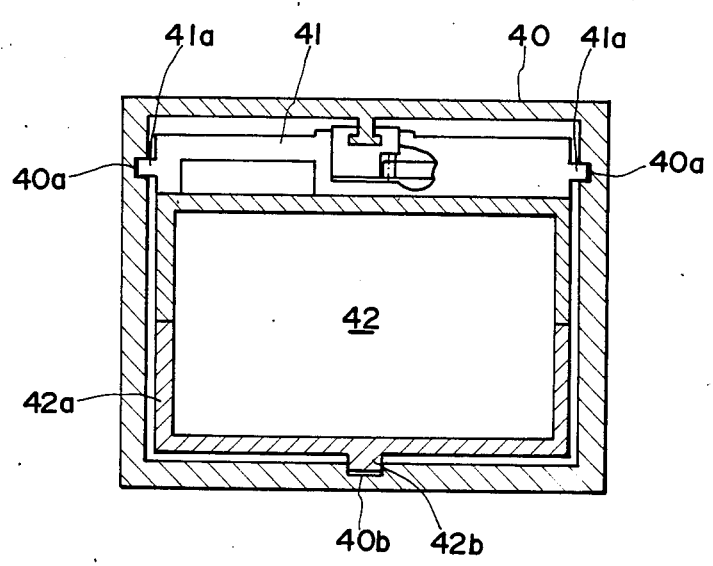
FIG. 6 is a sectional view of the illuminating angle adjusting device of a second embodiment of the present invention.

In other embodiment shown in FIG. 6, guide grooves (40a), (40a) are respectively formed at the upper part of the lateral internal surfaces of the zooming frame (40), and convex guide rails (41a), (41a) to be engaged with the guide grooves (40a), (40a) are formed at the lateral side walls of the driving system accommodation case (41). Thereby, generation of a large moment in the vertical direction can be prevented. Meanwhile, another guide groove (40b) is formed at the center of internal wall of bottom part of the zooming frame (40) and another guide rail (42b) to be engaged with the groove (40b) is formed at the center of external wall of bottom part of the lower mold (42a) of the light emitting part (42). Thereby, generation of a large moment in the lateral direction can be prevented.

Figure 7:
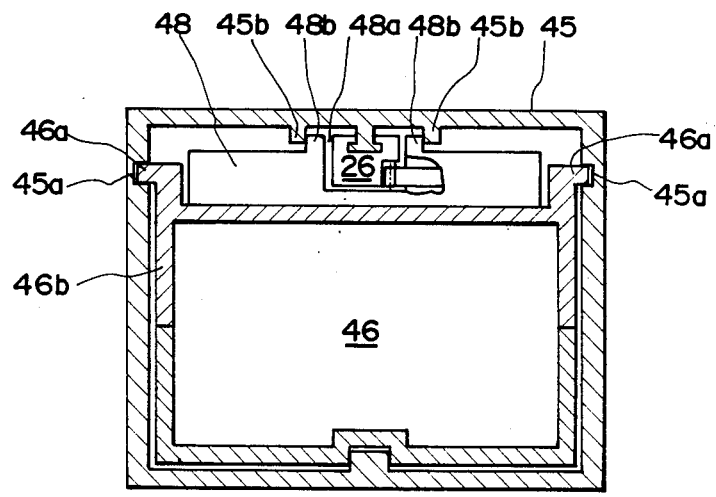
FIG. 7 is a sectional view of the illuminating angle adjusting apparatus of a third embodiment of the present invention.
Figure 8:
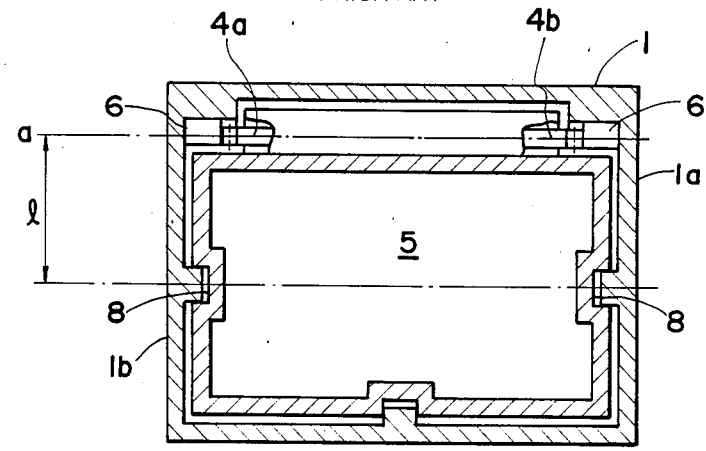
FIG. 8 is a sectional view of the illuminating angle adjusting apparatus of prior art.
Figure 9:
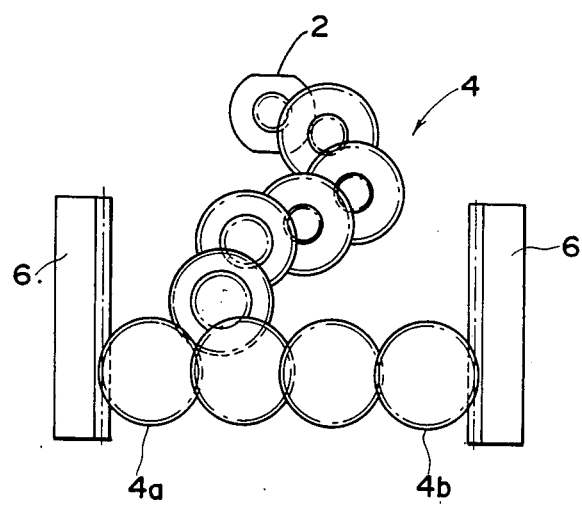
FIG. 9 is a plan view of a transmission mechanism of the prior art.

Moreover, in the third embodiment shown in FIG. 7, guide grooves (45a), (45a) are formed at the upper part of internal surface of the zooming frame (45) and guide rails (46a), (46a) to be engaged with such guide grooves (45a), (45a) are formed at the extended part of the lateral side walls of the upper mold (46b) of the light emitting part (46). Thereby, generation of a large moment in the vertical direction can be prevented.

On the other hand, in this embodiment, the driven member (26) is arranged in such a way as forming sufficient space within the concave portion (48a) of the driving system accommodation case (48) and generation of a large moment in the lateral direction is not prevented at this area. In the case of this embodiment, a pair of guide rails (48b), (48b) are formed at the upper surface of area near the concave groove (48a) for preventing generation of a large moment in the lateral direction and another pair of guide rails (45b), (45b) are also formed at the area near the center of upper internal wall of the zooming frame (45). Thereby, the guiding function can be realized by the internal surface of the guide rails (45b), (45b) and the external surface of guide rails (45b), (45b).

What is claimed is:

1. An illuminating angle adjusting apparatus for an electronic flash device, comprising:

a body member including a motor for generating a driving force;

a light emitting portion disposed in said body member and including a light emitter;

a zooming frame carrying an optical lens at its front portion and movable relative to said light emitting portion for adjusting an illuminating angle of said electronic flash device;

a transmission mechanism for moving said zooming frame relative to said light emitting portion, said transmission mechanism including a driving force output means disposed almost at the center of said body member in the lateral direction and a driven means disposed almost at the center of said zooming frame for engaging with said driving force output means thereby being moved by said output means; and a pair of guide means disposed on the respective side portions of said body member and said zooming frame, each of said guide means including guide portions disposed in said body member and said zooming frame respectively, and said guide means being disposed almost in the same vertical position as said transmission mechanism.

2. An illuminating angle adjusting apparatus as set forth in claim 1, further comprising an accommodating portion accommodating said transmission mechanism and arranged in said light emitting portion at the almost center position of the zooming frame in the lateral direction.

3. An illuminating angle adjusting apparatus as set forth in claim 2, further comprising a second guide means disposed close to said driving force output means and said driven means for guiding the movement of said zooming frame.

4. An illuminating angle adjusting apparatus as set forth in claim 1, wherein said guide means comprises a guide rail and a guide groove.

5. An illuminating angle adjusting apparatus as set forth in claim 4, wherein said guide rail is arranged in said zooming frame, and said guide groove is arranged in said light emitting portion.

6. An illuminating angle adjusting apparatus as set forth in claim 5, wherein said light emitting portion includes an upper portion and a lower portion, said upper portion includes said accommodating portion and said guide groove.

7. An illuminating angle adjusting apparatus as set forth in claim 4, wherein said light emitting portion includes an upper portion and a lower portion, said upper portion includes said guide rail and said zooming frame includes said guide groove.

8. An illuminating angle adjusting apparatus as set forth in claim 3, wherein said driven means is formed as a part of said second guide means.

9. In an electronic flash device in which the illuminating angle can be adjusted, said electronic flash device including a body member which has left and right side walls and which defines an imaginary vertical central plane therethrough; a light-emitting device positioned within the body member; a drive motor attached to said body member; a zooming frame movably mounted on the body member, said zooming frame having left and right side walls and an optical lens; a transmission mechanism for moving said zooming frame relative to said body member based on the operation of said drive motor, said transmission mechanism being generally located in an imaginary horizontal plane; and cooperating guide means on the corresponding left and right side walls of said body member and said zooming frame; the improvement wherein said zooming frame includes a drive member which is located adjacent said imaginary vertical central plane, wherein said transmission means includes an actuation member which cooperates with said drive member to cause said zooming frame to move relative to said body member; and wherein said cooperating guide means on the corresponding left and right side walls of said body member and said zooming frame are located adjacent to said imaginary horizontal plane.

* * * * *